United States Patent [19]
Blair et al.

[11] Patent Number: 6,019,549
[45] Date of Patent: Feb. 1, 2000

[54] VORTEX SHEDDING STRAKE WRAPS FOR SUBMERGED PILINGS AND PIPES

[75] Inventors: Russell M. Blair, Westport; C. Peter Ziehl, Easton; Anthony E J Strange, Southbury; Michael F Maucieri, Fairfield, all of Conn.

[73] Assignee: Corrosion Control International LLC, Seymour, Conn.

[21] Appl. No.: 08/902,182

[22] Filed: Jul. 29, 1997

Related U.S. Application Data

[63] Continuation-in-part of application No. 08/661,556, Jun. 11, 1996, Pat. No. 5,816,746
[60] Provisional application No. 60/024,365, Jul. 31, 1996.

[51] Int. Cl.[7] .................................................. E04C 3/30
[52] U.S. Cl. ........................... 405/216; 24/460; 52/590.3; 52/592.4; 52/721.5; 52/723.2; 52/737.5
[58] Field of Search ............................ 24/460, 461, 462; 52/590.2, 590.3, 592.1, 592.4, 721.4, 721.5, 723.1, 723.2, 737.4, 737.5, 738.1; 405/211, 211.1, 212, 216, 231, 252.1

[56] References Cited

U.S. PATENT DOCUMENTS

| | | | |
|---|---|---|---|
| 1,362,651 | 12/1920 | Towns | 198/699 |
| 1,517,846 | 12/1924 | Lewis | 52/302.5 |
| 2,385,869 | 10/1945 | Lane | 405/216 |
| 2,604,838 | 7/1952 | Traver | 454/1 |
| 2,897,553 | 8/1959 | Gorrow | 52/723.2 |
| 3,076,533 | 2/1963 | Scruton et al. | 52/740.9 |
| 3,105,866 | 10/1963 | Little | 174/42 |
| 3,352,118 | 11/1967 | Burkhardt | 405/211 |
| 3,383,869 | 5/1968 | Jarlan | 405/211 |
| 3,454,051 | 7/1969 | Goepfert et al. | 138/178 |
| 3,573,348 | 4/1971 | Herrmann | 174/101.5 |
| 3,581,449 | 6/1971 | Huber et al. | 52/84 |
| 3,621,663 | 11/1971 | Otani | 405/231 |
| 3,884,173 | 5/1975 | Fabula | 114/243 |
| 3,991,550 | 11/1976 | Cohen | 57/212 |
| 4,059,129 | 11/1977 | Feis | 138/37 |
| 4,193,234 | 3/1980 | Wong | 52/173.1 |
| 4,230,423 | 10/1980 | Oshima et al. | 405/211 |
| 4,239,419 | 12/1980 | Gillen, Jr. | 405/232 |
| 4,244,156 | 1/1981 | Watts, Jr. | 52/746.1 |
| 4,405,262 | 9/1983 | Nagashima | 405/221 |
| 4,549,035 | 10/1985 | Zaltsberg | 174/42 |
| 4,802,997 | 2/1989 | Fox et al. | 424/407 |
| 5,079,305 | 1/1992 | Mlachnik | 24/20 LS |
| 5,102,265 | 4/1992 | Dokmo et al. | 405/216 |
| 5,188,485 | 2/1993 | Forster et al. | 405/232 |
| 5,435,667 | 7/1995 | Strange | 405/216 |
| 5,516,236 | 5/1996 | Williams et al. | 405/216 |
| 5,573,354 | 11/1996 | Koch | 405/216 |

FOREIGN PATENT DOCUMENTS

| | | |
|---|---|---|
| WO9321392 | of 1993 | United Kingdom . |
| 2303898A | of 1997 | United Kingdom . |
| WO9204504 | of 1992 | WIPO . |

OTHER PUBLICATIONS

NICC Ltd. (UK) Low Profile Armawrap promotional publication, 1986.

*Primary Examiner*—William Neuder
*Assistant Examiner*—Tara L. Mayo
*Attorney, Agent, or Firm*—Ware Fressola Van Der Sluys & Adolphson LLP

[57] ABSTRACT

Flexible elastomer wrap panels stretched and clamped encircling submerged pilings, risers and pipelines are coated to resist degradation by any form of marine life, and incorporate an interior pile-facing felt layer impregnated with a corrosion inhibiting and biocidal gel, providing long term protection for pilings and like submerged objects. The wrap panels present radial rib-strakes protruding outward from the piling and extending along the piling in a longitudinal direction, either vertically, parallel to the vertical axis of the piling or pipe, or slanting helically, reducing or eliminating aeolian vibration induced by flowing ocean currents causing vortex formation.

20 Claims, 5 Drawing Sheets

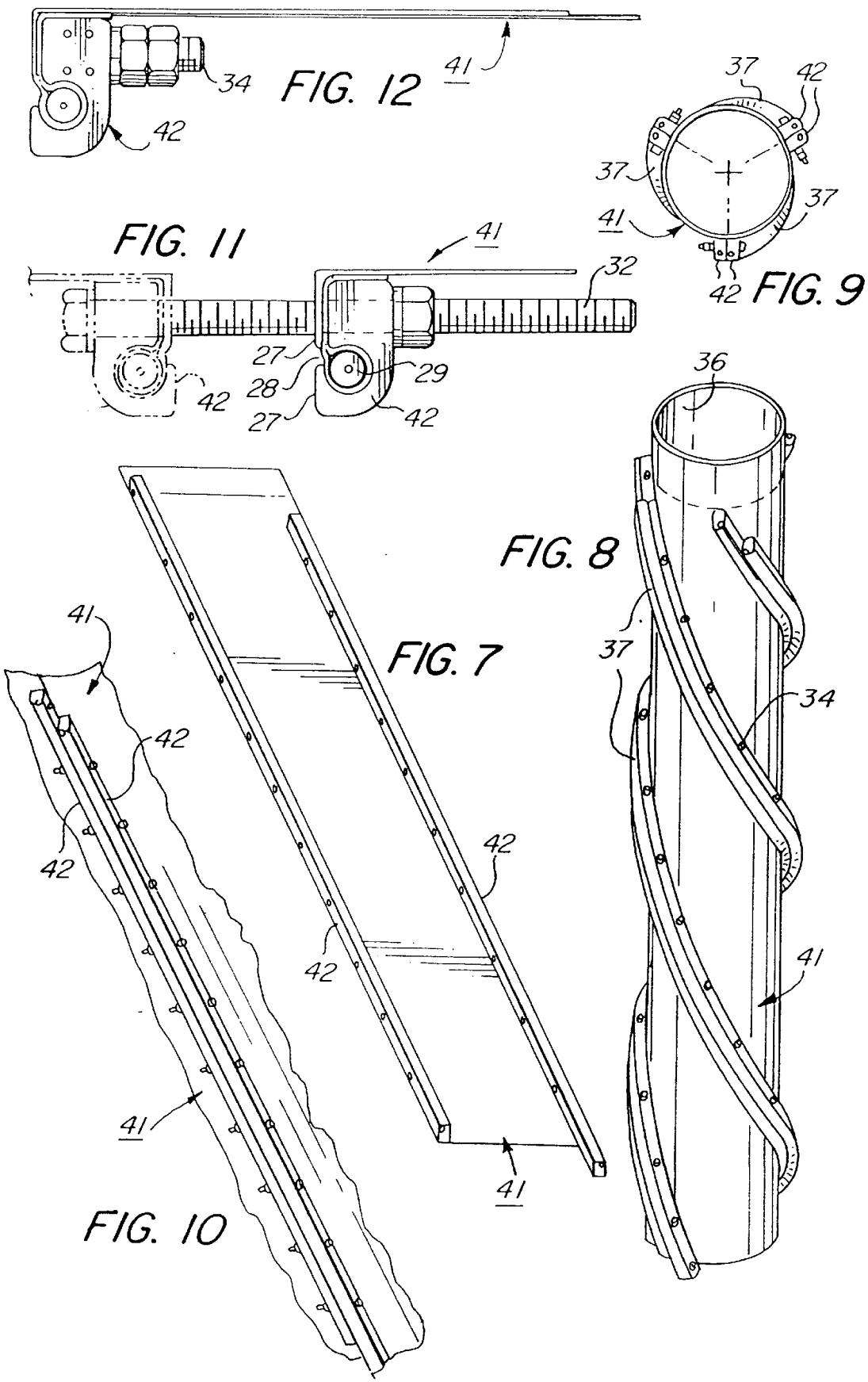

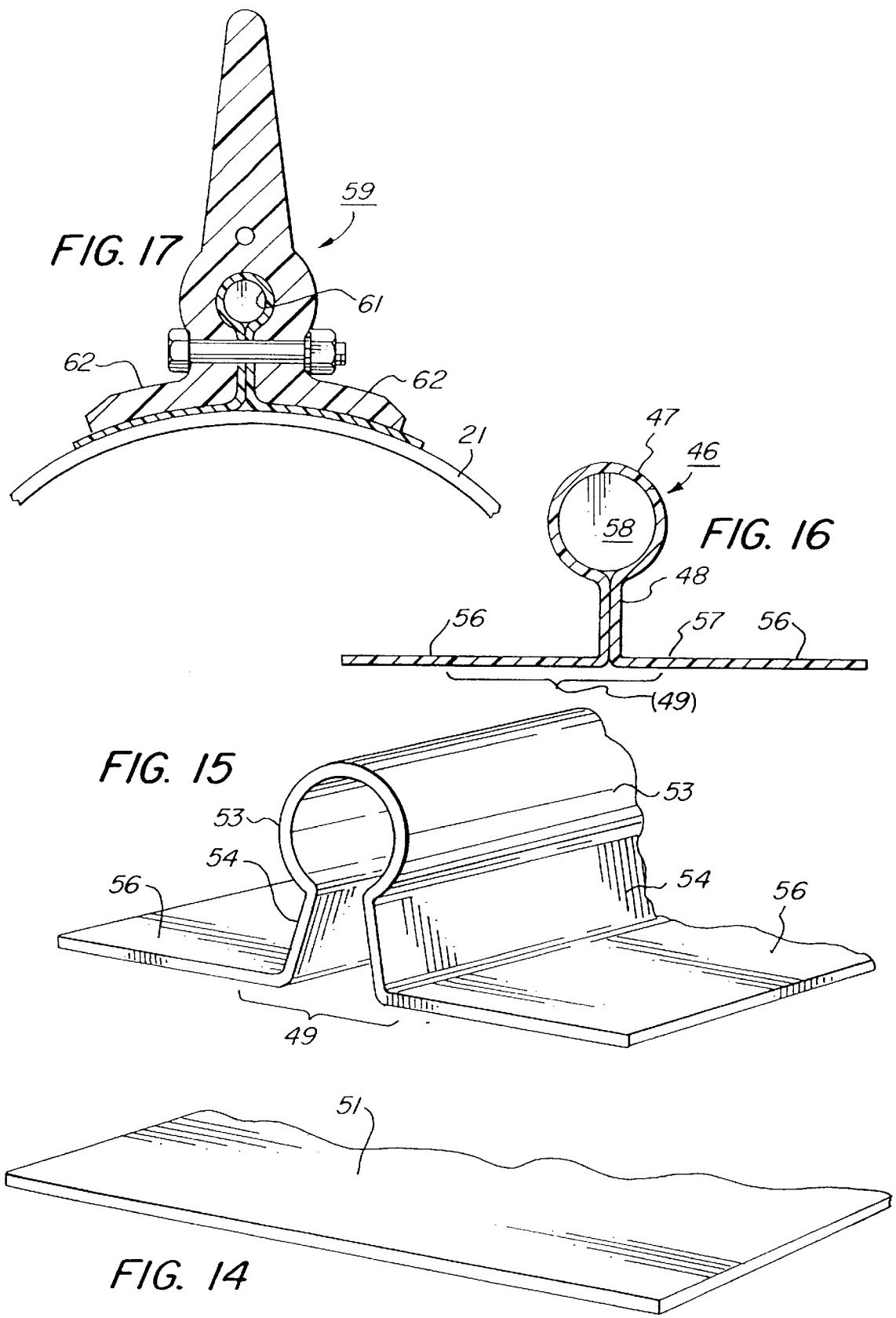

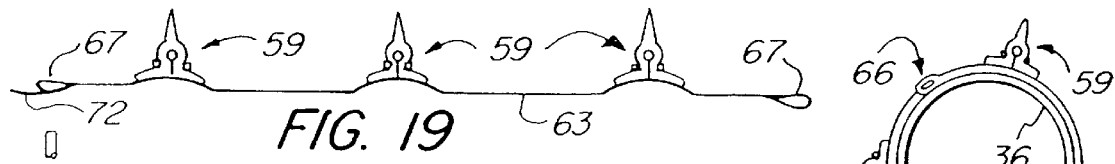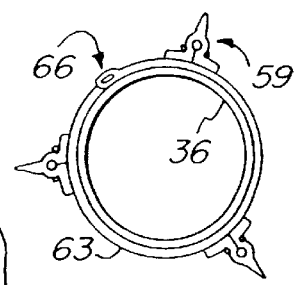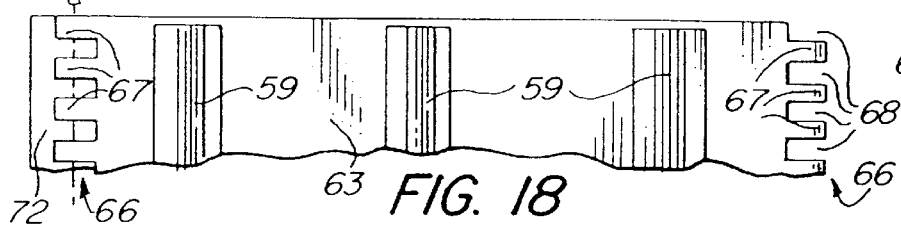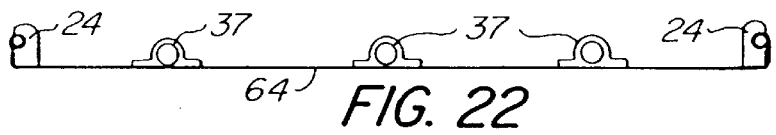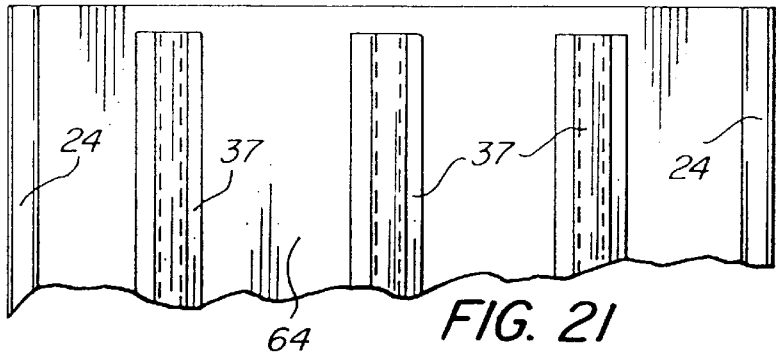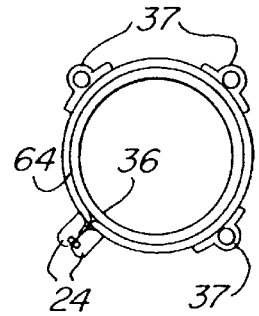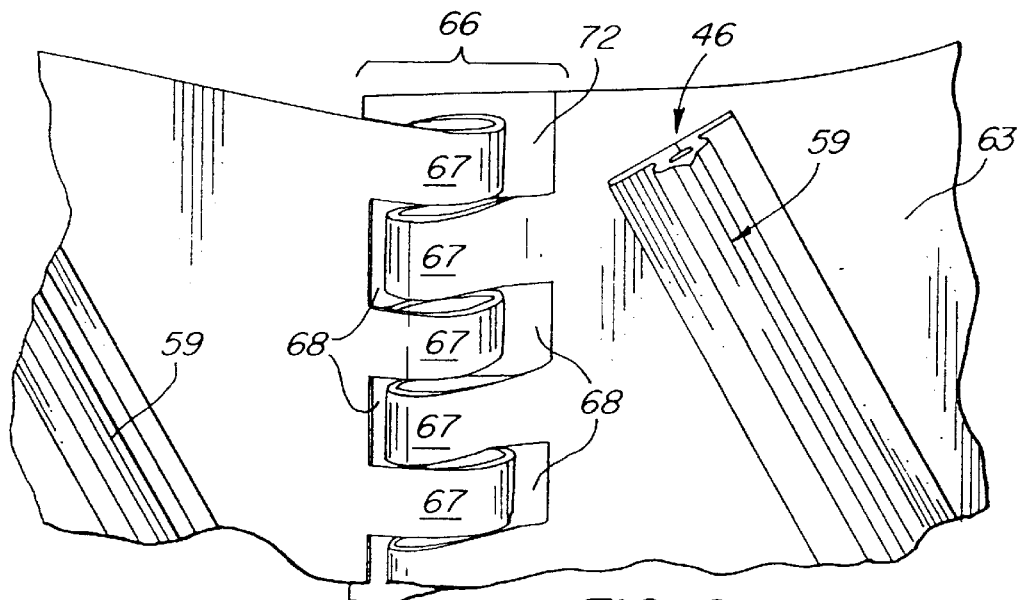

VORTEX SHEDDING STRAKE WRAPS FOR SUBMERGED PILINGS AND PIPES

CROSS-REFERENCE TO RELATED APPLICATIONS

This application is a continuation-in-part of application Ser. No. 08/661,556, now U.S. Pat. No. 5,816,746 of Russell M. Blair, filed Jun. 11, 1996, and of co-pending Provisional Application Ser. No. 60/024,365 of Russell M. Blair, A. E. J. Strange and Michael F. Maucieri, filed Jul. 31, 1996.

FIELD OF THE INVENTION

This invention relates to flexible elastomer wraps for submerged pilings, risers and pipes, and particularly to such wraps carrying fins protruding therefrom which extend as longitudinal or helical fins or ribs from the periphery of the wrapped submerged piling after the wraps have been deployed and secured thereon in permanent assembly.

Solid objects submerged in and exposed to relative movement of a body of fluid, such as smokestacks or overhead cables exposed to wind, or pilings and pipes exposed to ocean currents, produce vortices travelling downstream with the wind or current, sometimes call Von Karman vortex streets accompanied by vibratory movement or aeolian vibrations which may produce resonant vibratory stresses, weakening or damaging the submerged solid structure. Fins protruding from the peripheral surface of the submerged solid object are known to reduce or eliminate such vortex formation, thus minimizing or eliminating any vibratory movement which might be deleterious to the solid structure.

BACKGROUND OF THE INVENTION

Vibration of chimneys exposed to wind and pilings exposed to ocean currents has been mentioned in numerous United States patents. For example, U.S. Pat. Nos. 3,352,118; 3,383,869 and 4,230,423 all discuss marine pilings but do not suggest that helical ribs could be useful for shedding vortices or minimizing vortex formation. Surface protuberances are suggested in several United States patents, such as U.S. Pat. Nos. 4,193,234; 4,059,129; 3,581,449, 2,604,838 and 3,076,533.

Feis U.S. Pat. No. 4,059,129 shows protrusions formed as segments of helical ribs arrayed in vertical rows on chimneys.

Scruton U.S. Pat. No. 3,076,533 shows helical ribs protruding from the outer surface of chimneys exposed to wind and recommends particular parameters and ratios for the shape of such ribs. For example, Scruton U.S. Pat. No. 3,076,533 shows in its FIG. 3 a wind tunnel model of a chimney with three protruding ribs extending outward from its peripheral surface, at a pitch of approximately 12 times the diameter of the chimney. The text in columns 1 and 4 of this patent mentions that the optimum helix pitch for three equiangularly spaced strakes is of the order of 15 times the diameter or characteristic transverse dimension D. In column 4, ribs or strakes of different heights extending radially from the outer surface of the chimney are described, with heights ranging from 0.029 D to 0.118 D, stating that at 0.118 D the aeolian instability is "reduced to a very small area and only a very small value of structural damping is required to eliminate the oscillations."

This Scruton patent indicates that round stacks should never require strakes higher than ⅛ of D, even when minimum damping is provided by the solid structure itself.

Helical ribs employed for vortex shedding are suggested for overhead wires or cables exposed to the wind, in Zaltsberg U.S. Pat. No. 4,549,035 and Little U.S. Pat. No. 3,105,866; or for towing lines or towed cables exposed to the ocean in Fabula U.S. Pat. No. 3,884,173 and Cohen U.S. Pat. No. 3,991,550. In each of these four patents a single helical rib or strake is employed, and the relative movement of the body of fluid in which the solid object is immersed is not always transverse to the axis of the object; in all these cases it may be in many different directions, some nearly parallel to the axis of the object itself.

BRIEF SUMMARY OF THE INVENTION

It has now been discovered that vortex shedding ribs or strakes may be installed on submerged pilings and piping exposed to ocean currents by incorporating these strakes as components of a flexible wrap providing corrosion resistance and biocidal protection for the submerged piling, and which is itself deployed and clamped in position embracing the external surface of the piling or pipe. The strakes may be formed by a pair of clamping flanges mounted along the adjacent edges of parallelogram-shaped wrap segments which are positioned side-by-side encircling the outer surface of the piling or pipe, and then clamped in position.

Alternatively, the ribs or strakes may be positioned vertically or diagonally on a flat rectangular panel of flexible wrapping material, dimensioned to encircle by itself a single piling, with clamping flanges mounted along its vertical edges, which can be brought together, stretching the wrap panel by a small but substantial amount, to assure its close embrace around the outer surface of the piling. The wrap is then clamped in this deployed position, thus presenting the strakes in longitudinal or helical configuration encircling the wrapped piling. The strakes themselves may be formed as several different alternative structures.

Accordingly, a principal object of the present invention is to provide wraps for submerged pipes and pilings providing protection against corrosion or damage from marine growths, while also minimizing "galloping" vibratory aeolian movement of the submerged solid object caused by vortices produced by the moving ocean currents.

A further object of the invention is to provide these advantages with flexible wrap panels conveniently installed where required at particular subsurface depths as a retrofitted wrap which eliminates the need for permanent ribs or strakes forming an integral part of the total structure of the submerged pipe or piling.

Another object of the invention is to provide such advantageous features in economical products preferably formed of elastomer sheet material with protruding flexible fins permanently mounted thereon, with the entire elastomer structure being conveniently fabricated, stored, shipped and deployed with minimum expense and minimum labor.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

THE DRAWINGS

For a fuller understanding of the nature and objects of the invention, reference should be made to the following detailed description taken in connection with the accompanying drawings, in which:

FIGS. 4, 5 and 6 are detailed views of the structure shown in FIGS. 1 to 3, in which FIG. 4 is a fragmentary enlarged view of the clamping flanges secured to the vertical edges of the wrap of FIG. 1 shown during installation as the wrap is being stretched by drawing the clamping flanges together;

FIG. 5 is a fragmentary enlarged top cross sectional view of section 5—5 in FIG. 1 showing the clamping flange along one edge of the wrap of FIG. 1 and the diagonal strake protruding from the wrap;

FIG. 6 is a fragmentary enlarged front view of region 6A of FIG. 1, showing the same flange and a different strake extending from a point close to the flange in a diagonal direction on the surface of the wrap;

FIGS. 7–12 show an alternative form of the present invention in which FIG. 7 is a front elevation view of a parallelogram-shaped wrap segment having mounting flanges positioned protruding from both of its parallel edges, ready for installation with two similar wrap segments to form the combined structure illustrated in the front perspective view of FIG. 8, where adjacent pairs of clamping flanges are drawn together at three different locations around the submerged piling, themselves forming three helical strakes protruding from the exposed outer surface of the piling and wrap assembly, as shown in FIG. 8.

Figure 13:
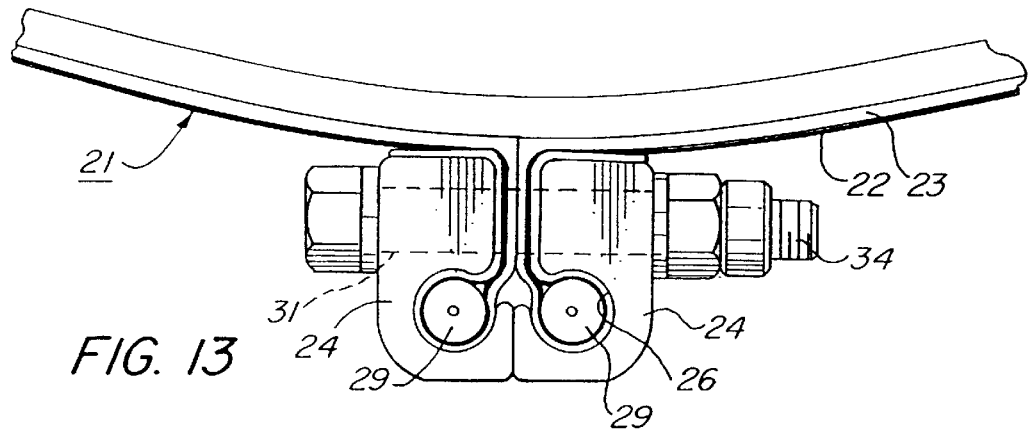

FIG. 9 is a top perspective view of the same assembly shown in FIG. 8, illustrating three pairs of clamping flanges joined together to protrude as strakes from the outer surface of the piling wrap;

FIG. 10 is a fragmentary front perspective view showing the adjacent flanges bolted together in their installed condition as shown in FIGS. 8 and 9, but the clamped flanges of FIG. 10 are joined together before the flexible elastomer wrap is curved around the piling to draw the last pair of edge flanges together;

FIG. 11 shows a fragmentary top plan view of the two flanges of this structure as they are first drawn together, and FIG. 12 indicates the short clamping stud and pair of clamping nuts assembled with the wraps or wrap segments during their manufacture, ready for use in the final clamping step of installation. Following the tensioning step illustrated in FIG. 11, the clamped condition of the pair of flanges is best seen in FIG. 13, which is a top plan view of the clamped flanges along adjoining edges of the installed piling wrap of the invention.

Figure 3:
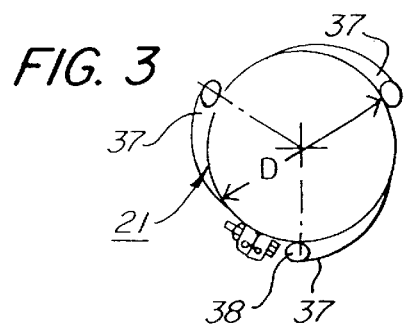
FIG. 3 is a top perspective view of the deployed wrap and piling of FIG. 2.
Figure 1:
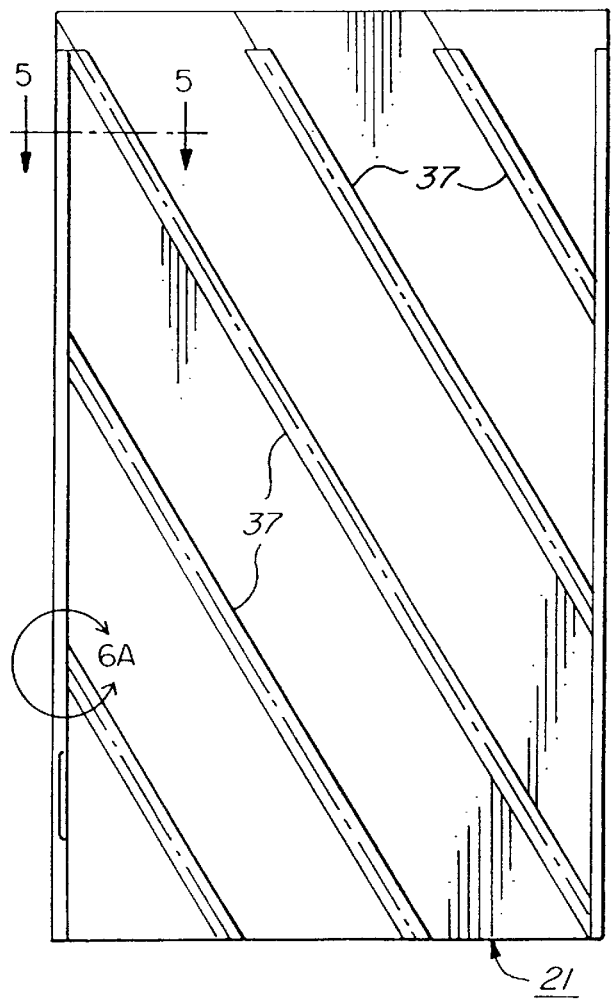
FIG. 1 is a front elevation view of the exposed outer surface of a flexible polymer wrap formed as a rectangular sheet with mounting flanges installed along its parallel side edges and diagonal ribs or strakes protruding from its exposed surface.
Figure 2:
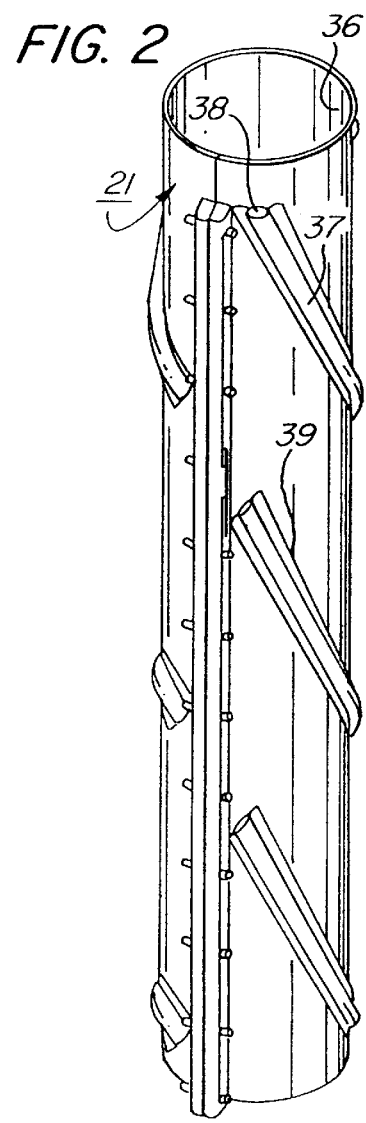
FIG. 2 is a fragmentary front perspective view of a portion of a vertical piling showing the wrap of FIG. 1 installed thereon.

A preferred form of the ribs or strakes illustrated in FIGS. 1–3 is shown in FIGS. 14 through 18 where a small flat sheet or strip of elastomer coated fabric material shown endwise in the fragmentary perspective view of FIG. 14 is formed with its central portion raised to form a keyhole shaped ridge best seen in the fragmentary perspective view of FIG. 15 with a circular arcuate top portion and two converging legs joining the top portion to lateral flange portions formed at the edge of the original strip, after which the converging legs are brought together as shown in the cross-sectional view of FIG. 16 to form an upstanding rail protuberance, and the two converging leg portions are heat sealed together to form the web of the rail while the circular arcuate portion forms the head of the rail;

FIG. 17 is a cross-sectional view of a slotted fin-strake with a keyhole shaped lower slot opening downward from its central lower portion, dimensioned to slide over the rail shaped protuberance of the mounting rail of FIG. 16. The rail of FIG. 16 is designed to be mounted and adhesively joined or heat sealed to the outer surface of the wrap panel, and the rib-strake is then positioned to slide lengthwise over the mounting rail, and preferably to be bolted thereto, as indicated in FIG. 17.

FIG. 18 is a front elevation view of a rectangular polymer wrap sheet, incorporating a plurality of the longitudinal rib-strakes shown in FIG. 17 deployed in non-helical fashion, with a non-flanged mortise-and-tenon flat closure;

FIG. 19 is a top plan view of the wrap sheet of FIG. 18;

FIG. 20 is a top plan view of the same wrap and closure installed on a piling;

FIG. 21 is a front elevation view of a rectangular wrap sheet with closure flanges and rigid tube rib-strakes like those shown in FIGS. 1–6, but with the rib-strakes extending longitudinally in non-helical fashion;

FIG. 22 is a top plan view of the rectangular wrap sheet shown in FIG. 21;

FIG. 23 is a top plan view of the same wrap and flanged closure installed on a piling; and FIG. 24 is a front elevation view of the mortise-and-tenon closure of FIGS. 18–20 on a wrap incorporating helically deployed diagonal rib-strakes of the kind shown in FIG. 17.

BEST MODE FOR CARRYING OUT THE INVENTION

FIGS. 2 and 8 show perspective views of the protective wraps for pilings and submerged piping characterizing the present invention. The helical projecting strakes required for vortex shedding protrude radially outward from the outermost surface of these protective wraps.

A rectangular wrap panel 21 generally indicated in FIG. 1 is formed as a sheet of water-impermeable flexible elastic polymer material having a woven reinforcing fabric embedded therein forming an outer skin 22. Skin 22 may include the cathodic protection system providing a carrier for sacrificial anode material and may be coated with a marine fouling release additive or coating. Adhesively secured to the inner pile facing surface of outer skin 22 is an inner layer 23 of liquid permeable material such as felt impregnated with a gel of water resistant sealant incorporating both corrosion inhibiting and biocidal components.

It is desirable that the pile wrap 21 not be permanently bonded to the piling, so that the wrap 21 may be removed to facilitate inspection of the piling. When this pile wrap is installed in situ on a submerged portion of a piling or pipe, seawater will be trapped between the inner skin 23 and the piling but the gel inhibitors on the inner skin layer 23 of wrap 21, such as modified metal alkyl amyl sulfonates, will neutralize the oxygen in the entrapped seawater, thereby preventing corrosion of the piling.

As indicated in FIG. 13, each edge of the rectangular wrap 21 is provided with a clamping connector channel or grooved clamping flange bar 24. Clamping flange bars 24 may be made of coated metal, plastic, composite or other materials suitable for a highly corrosive environment such as extruded aluminum or extruded rigid polyvinyl chloride. Each clamping flange bar 24 includes a retaining groove 26 extending lengthwise and opening outward through its inner face 27. Each groove 26 is generally circular in shape, narrowing to a smaller throat opening 28 having a width considerably smaller than the diameter of the retaining groove 26.

As clearly shown in FIG. 13, the edge of the wrap 21 extending around the piling is carried radially outward through the throat opening 28 and around the periphery of the circular groove 26 to be folded back along its outer surface between clamping flange bar 24 and the adjacent portion of wrap 21.

Figure 4:
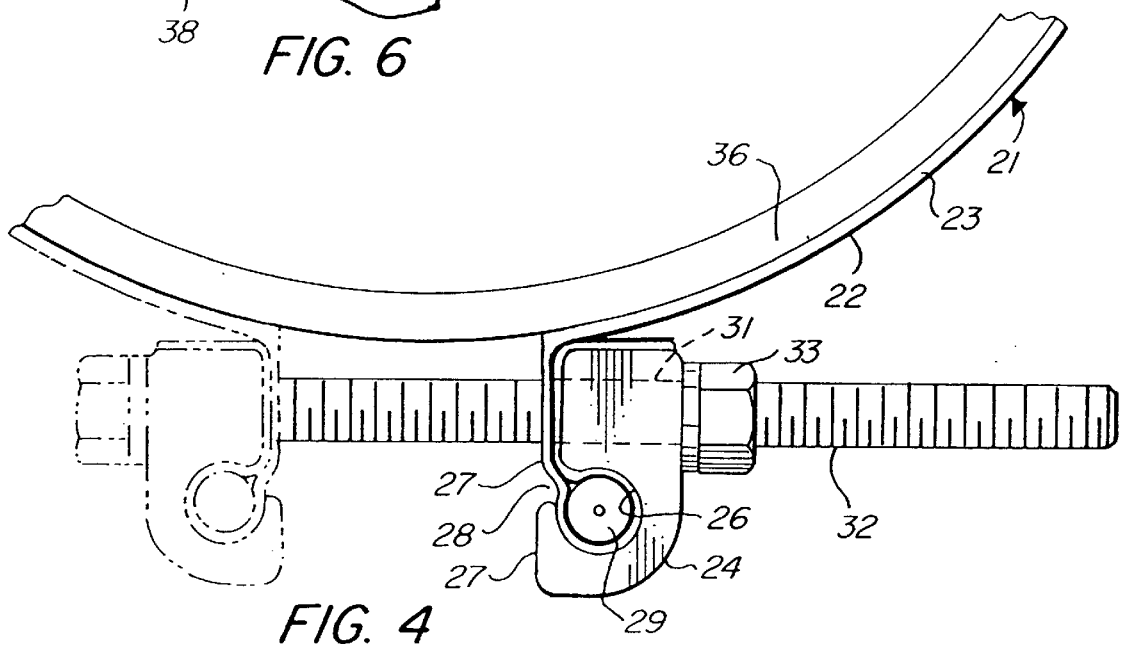

The edge of wrap 21 is held in clamping flange bar 24 by being wrapped around a retaining rod or cable 29, and flange bar 24 is telescopingly joined to the wrap edge by sliding the edge-wrapped rod 29 endwise into groove 26 of the flange bar 24 until complete telescoped engagement is achieved. The clamping flange bars 24 mounted in this fashion on each edge of wrap 21 are brought into facing relationship with their grooved inner faces juxtaposed facing each other. As indicated in FIG. 4, suitable clamping bolt holes 31 formed in clamping bars 24 are aligned with each other, and concentric holes are punched through both layers of the wrap 21 assembled on clamping flange bars 24, through bolt holes 31 in the bars 24; elongated tensioning bolts 32 (FIG. 4) are then threaded through both facing clamping flange bars 24 and the edges of wrap 21 assembled therein, so that the bolts 32 may be provided with tensioning nuts 33. Hydraulic or pneumatic torque wrenches may be employed to tighten nuts 33 on bolts 32, and thus to stretch the elastomer wrap material of wrap 21 by drawing clamping flange bars 24 closer together until they finally reach the abutting engagement illustrated in FIG. 13. In this position, alternate tensioning bolts 32 are removed and replaced by short clamping bolts 34, thus securing the stretched wrap 21 in deployed position closely embracing the outer surface of the piling indicated as 36 in FIG. 13.

Figure 5:
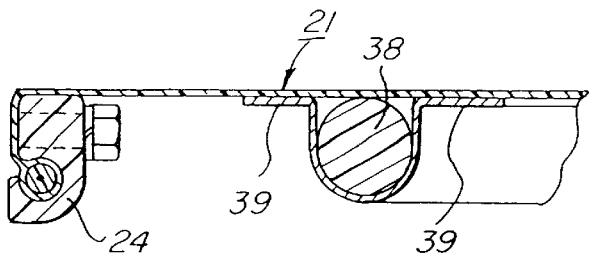
Figure 6:
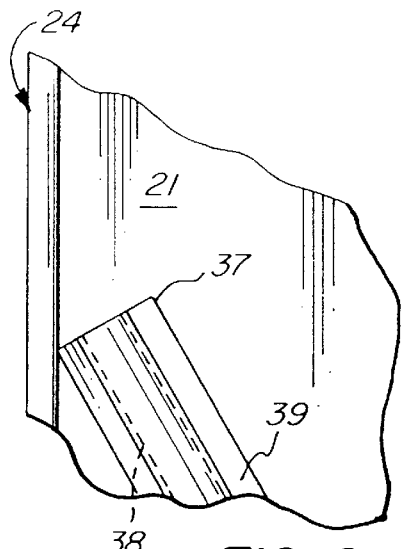

As clearly shown in FIG. 3, diagonal ribs are formed as projecting strakes 37 protruding radially outward from the outer surface of wrap 21. These strakes 37 are formed by relatively rigid reinforced flexible tubes 38 having a diameter of approximately 1½ inches, embraced by a urethane coated nylon fabric band 39 partially encircling and embracing tube 38 and securing it firmly against the outer surface of wrap 21. This is shown in FIGS. 5 and 6 where both edges of the nylon band 39 are shown adhesively bonded to the surface of wrap 21, securing tube 38 in a tight embrace in its desired diagonally arrayed position, as shown in FIG. 1.

When the two flanged edges of wrap 21 are brought together, clamping wrap 21 securely around the external surface of the piling 36, the diagonal strakes 37 are thus arrayed helically around the assembly as indicated in FIG. 2 and the radial extent of their protrusion from the outer surface of wrap 21 is indicated in FIG. 3, to be about ⅒ of the dimension D representing the external diameter of the piling 36.

An alternative form of strake 37 is shown in FIGS. 14–17, and described in more detail hereinafter.

Parallelogram Wrap Panels

A second embodiment of the vortex shedding wraps of this invention incorporating parallelogram shaped panels of wrap material is shown in FIGS. 7–12. The parallelogram shaped wrap panel 41 illustrated in FIG. 7 has a "circumferential" width perpendicular to the piling axis of approximately ⅓ of the width of the rectangular wrap 21 shown in FIG. 1. Thus if wrap 21 is 42 inches wide overall, the parallelogram-shaped wrap panel 41 would be 14 inches wide in the direction perpendicular to the piling axis.

The slanted parallel edges of parallelogram-shaped wrap panel 41 are each provided with clamping flange bars 42.

Parallelogram-shaped panels 41 are designed to be assembled in groups of three sub-panels to form a compound parallelogram wrap whose transverse dimension is no more than 10% smaller than the circumference of the piling to be embraced therein. For this purpose, the clamping flange bars 42 of three adjacent sub-panels are first juxtaposed to place the three panels 41 into parallel alignment, and the short closure flange clamping bolts 34 secure these wrap panels 41 together to form a triple compound parallelogram-shaped wrap panel. The compound panel is then wrapped around the piling in the manner shown in FIG. 8 with its pairs of abutting clamping flange bars 42 bolted together by the clamping bolts 34 themselves providing the strakes 37 as indicated in FIG. 8.

Bars 42 are all provided with spaced bolt holes aligned to permit tensioning installation bolts 32 to draw the final bars together to complete the deployment of the combined wrap panels 41 to completely embrace and enclose piling 36 as indicated in FIG. 8.

In order to achieve this helical wrapping of the strakes formed by abutting diagonal clamping bar pairs 42, it may be necessary to pre-form pairs 42 in a helical shape, or to apply considerable inward radial wrapping force to distort the flexible bar pairs as well as the flexible wrap skin materials in order to complete the wrapping operation. This may be performed with clamping rings, with tensioning jacks, with belts providing the hoop tension, or by any other suitable wrapping force applying arrangement.

When the free edges of the compound parallelogram wrap panel are brought into facing relationship as suggested in FIG. 11, the installation tensioning bolts 32 are installed in aligned apertures passing transversely through each of the bars 42, and torque applied to the bolts 32 draws these facing edge bars 42 closer together until they are brought into abutting relationship in the same manner as bars 24 shown in FIG. 13.

As indicated in FIGS. 8 and 9, the clamping closure flange bars 42 bolted together in facing abutting pairs by closure clamping bolts 34 themselves form the helical strakes 37 in this parallelogram wrap panel assembly. As indicated in the perspective top plan views of FIGS. 3 and 9, the cross sectional shape of the strakes 37 is somewhat different in the parallelogram wrap panel assembly shown in FIG. 9, as compared with the smooth simple streamlined strakes shown in FIG. 3 produced by the flexible tube 38 enclosed in the urethane coated nylon band 39 adhesively bonded to the outer surface of the rectangular wrap 21. As shown in FIG. 9 and also in FIG. 13, the pairs of bolt-clamped flange bars 42 are wider circumferentially than they are "high" in the radial direction, and their outer surfaces are interrupted at intervals by the heads of clamping bolts 34 as well as the clamping nuts secured thereon. However, these differences in overall shape of the clamped flanged bar pairs shown in FIGS. 8 and 9 are believed to have a negligible effect upon their capability for reducing vortex formation; since they extend helically around the entire circumference of the wrapped portion of piling 36, they have the effect of impeding or minimizing the formation of vortices caused by relative motion of seawater flowing in tidal currents past a submerged piling or pipe regardless of the direction of the tidal current, which encounters the helical strakes in all directions of its approach and tangent flow past the piling or pipe.

Alternative Rib-Strake Structure

FIG. 16 shows a stand-off rib 46, shaped in cross-section as a rail, with a round cylindrical head 47, a central stand-off web 48, and a wide supporting base 49, secured by adhesive or ultrasonic bonding to the outer surface of wrap 21, to replace the low profile ribs shown in FIGS. 1, 2, 3, 5 and 6, and preferably either vertical, parallel to the vertical wrap edges (FIGS. 18 and 21) or angled at about 30° from the vertical wrap edges, as in FIG. 1. The rib of FIG. 16 is preferably formed of flexible polymer sheet material such as urethane coated woven nylon tape 51, and its head 47 may enclose a polymer rod 58.

Rail-shaped rib 46 is formed by guiding nylon tape 52 through a fairlead-type guide, to form the raised keyhole shape shown in FIG. 15, where the top circular arcuate sector 53 is formed from the central part of tape 51. Converging leg panels 54 join the lower edges of arcuate sector 53 to the laterally extending side edges 56 of tape 51.

The rail-shaped rib 46 is then further guided into the cross-sectional shape shown in FIG. 16, where the sector 53 has now become head 47, the legs 54 are clasped abuttingly together and bonded by adhesive bonding or ultrasonic welding to form stand-off web 48, all supported by the underlying base 57 formed by the remaining side edges 56 of tape 51.

Preferably, the hollow circular cylinder passage inside head 47 is occupied by a polymer rope or rod 58, around which arcuate sector 53 is wrapped before leg panels 54 are bonded together to form web 48.

FIG. 17 shows an elongated extruded flexible inverted Y-shaped polymer extension wall strake 59 with a central keyhole-shaped core passageway 61 extending from end to end, separating its Y-shaped base flanges 62. The keyhole shaped core passageway 61 is dimensioned for telescoping engagement over the head 47, the stand-off web 48 and the base 57 of the stand-off key rail 46, and can then be bonded thereto by heat, ultrasonic or adhesive bonding. The wall strake 59 thus extends the height of the stand-off key rail 46 by 300% to 400%, measured from the outer surface of the underlying wrap 21.

The key rail 46, the wall strake 59 and the wrap 21 are all formed of flexible polymer, and can be deformed to conform to the outer surface of the piling, stretching the wrap as desired for bolted clamping installation.

The resulting longitudinal or helical strakes 59 interfere with laminar flow of seawater past the piling, impelled by tidal currents, suppressing or shedding Von Karman vortex development and consequent oscillating deflections or stresses in the piling or pipe. Notwithstanding the suggestions in prior patents that a helical pitch between 15 D and 20 D would be appropriate for vortex shedding in the atmosphere, it is now believed that pitch values ranging from about 4 D to about 22 D are all effective, particularly for minimizing vortex production on submerged pilings, risers and pipes exposed to waves, swells or tidal currents in seawater; for example, the rib keys 46 angled at about 30° from the pile's longitudinal axis or the vertical wrap edges have a pitch of $\pi D \div \tan 30°$ or $(3.1416 \div 0.5774)$ D or 5.44 D. A pitch between 5 D and 6 D is believed to be highly effective, and is preferred.

Extension Wall Strake

The preferred materials for forming the inverted Y-shaped wall strakes 59 are polyvinyl chloride elastomer, or commercial quality 40 durometer black Neoprene, ultraviolet stabilized and resistant to salt water and hydrocarbons. For best results, the strakes 59 extend over the full vertical height of the wrap 41, interrupting streamlined flow of tidal currents past pipes, risers or pilings 36 and producing turbulence which blocks aeolian vibrations or resonance accompanying vortex formation.

The wraps of this invention may employ a combination of materials exhibiting proven performance within a variety of operational environments. The components may be combined to form an assembly which is resistant to long term immersion in both seawater and fresh water and if desired, to resist biological and chemical attack. In addition, the assembly will withstand attack from environmental UV, ozone and temperature variations while providing permanent protection in service, by resisting wave and current forces. No labor intensive ancillary materials such as tapes, sealants or adhesives are used. This reduces to a minimum the possibility of human error and noncompatibility of components in the installation of the system.

The materials in these assemblies are stressed below their operational limits, ensuring a high safety factor in all parameters while in service. If accidentally punctured, the hoop tension created by the circumferential stretching of the wrap panels by an amount of deformation up to 10% will cause the gel impregnated within the inner layer carrier in the corrosion-resistant embodiments of these wraps to be exuded from the damaged area and "self seal". The inhibitor within the gel will neutralize any oxygenated water which has permeated through the damaged wrap at the time of impact. The design of the laminar wrap skin membrane and the hoop tensions involved combine to ensure that in the unlikely event of a tear being introduced to the wrap, the tear will not propagate.

The wrap panels are a multi-layer monocoque construction consisting of a polymeric textile reinforcement encapsulated within the polyurethane matrix and outer layer and may be bonded in-line if desired to a polyester or polypropylene penetration-resistant felt, impregnated with a corrosion inhibitor or biocide contained within a water resistant thixotropic gel, chosen to match the application for which the system will be supplied.

The Outer Skin

In designing the wraps of this invention the following operational parameters were considered in addition to those necessary for the material to retain hoop tension throughout the projected operational life of the fabric.

Polymer Coating to the Outer Skin

Various polymers were considered to meet the following requirements: toughness, abrasion resistance, good ultraviolet resistance, good ozone resistance, resistance to high temperatures, good adhesion to fabrics, proven long life under seawater, resistance to hydrocarbon oil contamination, resistance to degradation by any form of marine life, oxidization resistance and capability of being fabricated by in line welding.

The wrap panels are fabricated with outer skin 22 of textile reinforced fabric. The material has been specifically fabricated with the benefit of ten years of wrap development, and utilizes the data resulting from 35 years of oil boom construction and deployment in marine environments.

Primary Penetration Inner Skin 23

Polyester felt which provides the primary penetration and carrier for the corrosion inhibiting gel in the corrosion-resistant wraps is in line bonded during the production of the multi-layer fabric to become an integral part of the wrap panels.

The thixotropic gel and its attendant "active" corrosion inhibitors are factory applied to the point of saturation in quantities calculated to provide protection throughout the operational life of the product.

Thixotropic Corrosion Inhibiting Sealant Gel

Petrolatum based gel impregnating inner felt skin 23 exhibits a high degree of thixotropy, liquefying at installation to convey the active corrosion inhibiting additives to the interstices of the substrate while solidifying once again soon after installation.

The gel is intensely hydrophobic, dispersing water on contact with the substrate while remaining inert to the physical and chemical effect of marine and fresh water throughout the operational lifetime of the system.

Split Strake Closure Seal

Parallelogram-shaped wrap panels are interlocked by clamping closure flange bars 42, which are preformed marine resistant PVC split strake extrusions. The fabric and supplementary felt sealed under compression provides the environmental closure seal.

In the embodiment of FIGS. 7–12, corrosion resistant metal fasteners 34 are used to connect each of the three panels 41 and their attendant split strake clamping closure bars 42, which after installation provides three equi-spaced strakes 37 standing off the riser surface at a pitch of ≈5 D, as shown in FIGS. 8 and 9.

Other Alternative Embodiments

FIGS. 18 through 24 show several variations in the features already described. Longitudinal non-helical strakes 37 and 59, parallel to the axis of the cylindrical piling or pipe 36, are shown in the embodiments illustrated in FIGS. 21 and 18, bonded by adhesive bonding or ultrasonic welding to rectangular wrap sheets 64 and 63 respectively. Wraps with vertical rib-strakes are significantly effective in suppressing vortex formation and aeolian vibration, and are more economical and much simpler to fabricate and deploy than wraps with helical strakes.

The "Slimline" mortise-and-tenon closure 66 shown in FIGS. 18–20 and 24 employs interfitting finger loops of flexible wrap sheet material—tenons 67 fitting into mortises 68 (FIGS. 18, 19, and 24) with the loops aligned to receive a rigid closure bar 69 inserted through tenon loops 67 securing the wrap stretched in suitable tension on the pipe or piling 36. To provide complete wrap coverage of the piling surface behind closure 66, an underlapping edge panel extension 72 extending from a vertical edge of wrap panel 63, as shown in FIGS. 18 and 24.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also understood that the following claims are intended to cover all of the generic and specific features of the invention herein described, and all statements of the scope of the invention which, as a matter of language, might be said to fall therebetween.

What is claimed is:

1. A combination of a piling and piling-protecting and vortex-shedding wrap panel formed of stretchable and flexible elastomer sheet material, dimensioned for wraparound engagement encircling the exposed outer surface of a substantially vertical submerged pipe or piling having a longitudinal axis, comprising:

a quadrilateral sheet having two elongated parallel edges, and having an outer face and an inner piling-facing surface, a first elongated clamping means arrayed along the first of said parallel edges, a second elongated clamping means arrayed along the second of said parallel edges, said clamping means comprising cooperating arrays of apertured members provided with spaced apart fastening apertures positioned for cooperative alignment when the quadrilateral sheet is wrapped around a piling and said elongated clamping means are brought into juxtaposition, said outer face having protruding outward therefrom a plurality of elongated flexible rib-strakes extending along the length of said quadrilateral sheet, which are deployed when said sheet is wrapped around a piling, and fastening means extending through said fastening apertures and holding said clamping means in clamped alignment in said juxtaposition, whereby lateral aeolian vibrations caused by vortex streets Produced by horizontal currents flowing past the submerged pipe or piling in directions perpendicular to its longitudinal axis are minimized or eliminated.

2. The piling-protecting wrap panel defined in claim 1, wherein the rib strakes are formed by tubing anchored to said outer face of said quadrilateral sheet.

3. The piling-protecting wrap panel defined in claim 2 wherein the tubing is anchored to said outer face by a flexible band straddling the tubing and having extended edges securely bonded to said outer face on both sides of the tubing.

4. The piling-protecting wrap panel defined in claim 1 wherein each of the rib-strakes includes a non-flat shaped strip of elongated flexible tape having an outwardly extending central portion positioned between two laterally extending base portions bonded to said outer face.

5. The piling-protecting wrap panel defined in claim 4 wherein the outwardly extending central portion takes the shape of a rail with an enlarged head overlying an upstanding web.

6. The piling-protecting wrap panel defined in claim 4, further including an elongated flexible wall strake having an inverted Y-shape with a central core groove shaped for interfitting engagement of said outwardly extending central tape portion in said groove.

7. The piling-protecting wrap panel defined in claim 6 wherein the central tape portion has the shape of a rail incorporating a flexible rod enclosed in an enlarged head portion, and said central core groove has a corresponding rail cross-section.

8. The piling-protecting wrap panel defined in claim 6, further including a spaced plurality of permanent fastenings installed through the wall-strake and penetrating the central tape portion engaged in the core groove.

9. The piling-protecting wrap panel defined in claim 8, wherein the permanent fastenings are installed extending through spaced apertures formed in said inverted Y-shape wall strake.

10. The piling-protecting wrap panel defined in claim 4, including a spaced plurality of permanent fastenings extending through the wall strake and penetrating the central tape portion.

11. The piling-protecting wrap panel defined in claim 1 wherein said piling to be encircled and wrapped is a circular cylinder having a longitudinal central axis, said quadrilateral sheet is rectangular, and said clamping means comprise a pair of elongated clamping bars respectively extending substantially continuously along each of said elongated parallel edges, extending substantially parallel to the central axis of said cylindrical piling with said rib-strakes forming an acute angle with said clamping bars.

12. The piling-protecting wrap panel defined in claim 1 wherein the piling is a circular cylinder having a central axis, the quadrilateral sheet is parallelogram-shaped, and the elongated clamping means comprise clamping bars anchored along said parallel edges which themselves form one said helical rib-strake when they are joined in clamped alignment by said fastening means.

13. The piling-protecting wrap panel defined in claim 12, wherein said wrap panel comprises a plurality of parallelogram-shaped sub-panels joined together by a corresponding plurality of pairs of clamping bars forming the corresponding plurality of helical rib-strakes when each pair of clamping bars is joined in clamped alignment.

14. The piling-protecting wrap panel defined in claim 12, wherein said clamping bars anchored along said parallel edges are preformed in mating helical configuration.

15. The piling-protecting wrap panel defined in claim 1, wherein the elongated clamping means comprise mating mortise-and-tenon interfitting looped closures incorporating alternating tenon loops extending into aligned mortise notches along each of said parallel wrap edges, and wherein said fastening means is a rigid fastening bar extending through successive tenon loops on each wrap edge in alternating order, anchoring said wrap edges together.

16. The piling-protecting wrap panel defined in claim 1, wherein said quadrilateral sheet has an outer layer coated with a marine anti-fouling coating.

17. The piling-protecting wrap panel defined in claim 1, wherein said quadrilateral sheet has an inner layer of felt material impregnated with a corrosion-resisting gel.

18. The piling-protecting wrap panel defined in claim 1, wherein said quadrilateral sheet has an inner layer of felt material impregnated with a biocidal gel.

19. The piling-protecting wrap panel defined in claim 1, wherein said elongated rib-strakes extend longitudinally, substantially parallel to the normally vertical longitudinal axis of the piling protected by the wrap panel.

20. The piling-protecting wrap panel defined in claim 1, wherein said elongated rib-strakes extend helically with a pitch P between 5 times and 6 times the outer diameter D of the piling protected by the wrap panel.

* * * * *

UNITED STATES PATENT AND TRADEMARK OFFICE
CERTIFICATE OF CORRECTION

| | | |
|---|---|---|
| PATENT NO. | : 6,019,549 | Page 1 of 1 |
| APPLICATION NO. | : 08/902182 | |
| DATED | : February 1, 2000 | |
| INVENTOR(S) | : Russell M. Blair et al. | |

It is certified that error appears in the above-identified patent and that said Letters Patent is hereby corrected as shown below:

In column 10, Claim 6, line 39, after "groove" insert
 --thereby extending the height of the standoff key rail by 300% to 400%, in the radial direction--

In column 10, Claim 8, line 47, "wall-strake" should be
 --wall strake--

Signed and Sealed this

Seventeenth Day of July, 2007

JON W. DUDAS
*Director of the United States Patent and Trademark Office*